United States Patent Office 3,597,255
Patented Aug. 3, 1971

3,597,255
CARBON DIOXIDE TREATMENT OF SILICEOUS PIGMENT
Frank E. Toonder, Wadsworth, Ohio, assignor to PPG Industries Inc., Pittsburgh, Pa.
No Drawing. Filed Oct. 2, 1968, Ser. No. 764,619
Int. Cl. C09c 3/00
U.S. Cl. 106—309                    20 Claims

ABSTRACT OF THE DISCLOSURE

The viscosity of aged aqueous slurries of siliceous pigments is maintained at low values by contacting the siliceous pigment with gas containing at least 1 percent carbon dioxide prior to forming the slurry. The carbon dioxide may be introduced to the pigment either as a gas or as a solid.

---

This invention relates to siliceous pigment. More particularly, this invention relates to siliceous pigments which have been treated to improve the viscosity properties which they impart to their aged slurries.

Illustrative of the precipitated siliceous pigments which may be treated pursuant to this invention are those produced according to the teachings of U.S. Pat. 3,034,914, the entire disclosure of which is hereby incorporated by reference. The finely-divided siliceous pigment disclosed in this patent typically has an average ultimate particle size less than 1.0 micron, more normally, about 0.0005 to about 0.5 micron.

In practice, these precipitated pigments are analyzed for the multivalent metal ions present and the analytical result is reported as the oxide of the metal. Similarly, the pigment is analyzed for chloride ion and the result is reported as sodium chloride. An analysis is then made for silica. It is to be understood that silicon dioxide, whether physically present as amorphous silica, crystalline silica, a portion of a silicate anion, hydrated silica, or otherwise, will be included in the result of the analysis which is reported nominally as silica. A convenient manner of representing the analytical results is to characterize the pigment on an anhydrous basis by the formula $Z(SiO_2)_x$. The Z nominally represents one or more oxides of one or more multivalent metals and where $x$ is 3.3 or greater and preferably is 5 or greater. The value of $x$ advantageously is in the range of 3.3 to about 100 and preferably in the range of from about 5 to about 30 including fractional values. The Z portion of the formula may nominally represent the oxide of a bivalent metal such as CaO, or it may represent the oxide of a trivalent metal such as $Al_2O_3$. In a preferred species, Z represents principally the oxide of an alkaline earth metal such as calcium oxide.

A typical analysis of a pigment prepared in accordance with U.S. Pat. 3,034,914 is shown in Table 1 where "free water" refers to that water which may be removed from the pigment by heating the pigment in an oven at 110° C. for four hours and "bound water" refers to the difference between "ignition loss" and "free water." "Ignition loss" is the loss obtained by heating a sample of pigment for one hour at 1280° C. The pH is determined by mixing 5 grams of pigment with 100 milliliters of water and measuring the pH of the slurry. The surface area is determined according to the Brunauer-Emmett-Teller method (BET method) and is described in the Journal of the American Chemical Society, volume 60, page 309 (1938).

TABLE 1

$SiO_2$—80 percent
Ca expressed as CaO—5 percent
Al expressed as $Al_2O_3$—1 percent
Fe expressed as $Fe_2O_3$—0.2 percent
Cl expressed as NaCl—1 percent
Free water—.7 percent
Bound water—6 percent
pH—9.5
Surface area—40 square meters per gram
Average ultimate particle size—0.1 micron When a pigment of this class is flowable powder, sometimes denominated a "dry" powder, the free water content is in the range of 0 to about 70 percent by weight. Often the free water is in the range of 0 to about 50 percent by weight. Such powder is "dry" to the touch and "dry" in appearance and is capable of being poured from one container to another with the usual characteristics of other powdered solids. When such a powder is slowly poured onto a flat surface, the resulting pile will exhibit an angle of repose greater than zero.

When an undried pigment of this class is a paste, the free water content is in the range of more than about 70 to about 85 percent by weight. Such a paste may be formed into chucks with jagged edges or into round, smooth pellets which will substantially hold their shape when placed upon a plane surface. When pigment is filtered from a slurry, the resulting filter cake is a paste.

Neither the chemical structure nor the chemical bonding of these pigments is known with accuracy. X-ray diffraction data show them to be amorphous. Such pigments do not appear to be true silicates in the classical sense, as for example, calcium monosilicate, $CaSiO_3$, where the ratio of CaO to $SiO_2$ is unity. Nor do these pigments appear to be merely mixtures of simple oxides such as calcium oxide and $SiO_2$. It does appear, however, that the multivalent metal oxide and silica are bound together in some manner but in varying degrees throughout the substance. Such factors as Van der Waals forces, spatial hindrance, polarity of bonds, ion exchange capabilities and hydration of the silica are thought to be partially responsible for the properties of the class of pigment.

Siliceous pigments are employed in several chemical industries, notably, the paper and rubber industries. It is often convenient to ship and store these pigments in the form of a finely-divided dry powder, particularly where storage of the pigment over a period of many days is anticipated. The usual containers for handling powdered materials such as bags, hopper cars, trucks or drums may be utilized in the handling of these pigments.

Nevertheless, while it is advantageous to ship and store pigment as a powder, it is often desirable to introduce siliceous pigment to a process in the form of a slurry. There are several reasons for this procedure. A major advantage is flexibility. When the pigment is added to a process in 50-pound bags, for example, it is inconvenient to use increments of addition other than 50-pound units. The addition of pigment in slurry form makes it convenient to effect minor adjustments to the process. Further advantages of slurry systems are convenience of storage, reduction of manpower requirement, and better adaptability to automatic control or automation. In addition, by mixing slurries of sufficiently high solids content, more pounds of pigment can be stored per unit volume in slurry form than in the dry or bag form.

Aqueous slurries prepared from the hereinbefore described pigments usually have concentrations in the range of from about 1 pound of pigment per gallon of slurry to about 5 pounds per gallon, although greater or lesser concentrations may be used if desired. As used throughout the specification, "pounds per gallon" of a pigment slurry is determined as follows:

(1) A 10 to 20 gram sample of slurry is dried in an oven at 110° C. for 4 hours. The percent solids is considered equal to:

$$\frac{107 \times \text{weight to nearest 0.01 gram of oven dry pigment}}{\text{weight to nearest 0.01 gram of slurry}}$$

The factor of 107 allows for about 7 percent free water in the pigment. Free water typically ranges between about 5 and about 12 percent. Thus, the term "solids" includes anhydrous material, bound water and about 7 percent free water.

(2) The specific gravity of the slurry is determined by weighing equal volumes of slurry and water and dividing the weight of the slurry by the weight of the water.

(3) Pounds per gallon are considered equal to:

$$\frac{\text{Percent solids} \times \text{Specific gravity}}{12}$$

When using the exemplary pigment of Table 1, the relationship between concentrations expressed in pounds per gallon and percent solids is shown in Table 2.

TABLE 2

| Pounds per gallon: | Percent solids |
|---|---|
| 1 | 11.2 |
| 2 | 21.2 |
| 3 | 30.2 |
| 4 | 38.6 |
| 5 | 46.1 |

Aqueous slurries prepared from the hereinbefore described pigments and having a pigment concentration of about 1 pound per gallon or greater commonly increase in viscosity upon aging. By "aging" is meant the passage of time after preparation of the slurry. A 2 pound per gallon slurry aged for about 2 days to about 2 weeks often attains a viscosety of 10,000 centipoises or more. A similarly aged 4-pound per gallon slurry often attains a viscosity in excess of about 50,000 to 100,000 centipoises. Thixotropic slurries of the type with viscosities below about 5,000 centipoises as measured by the Brookfield Viscometer at 20 r.p.m. and 25° C. are usually conveniently pumped by commonly available commercial equipment. Specialized equipment sometimes can pump fluids with viscosities as high as 10,000 centipoises. It is usually much more economical and convenient, however, to handle slurries with viscosities substantially below about 5,000 centipoises, preferably below about 2,000 centipoises. Further savings may be realized by maintaining viscosities below about 500 centipoises.

According to this invention, it has been found that the viscosity of a siliceous pigment slurry may be maintained low by contacting flowable siliceous pigment powder represented on an anhydrous basis by the formula $Z(SiO_2)_x$ with a gas having a carbon dioxide concentration in the range of 1 to 100 percent by weight before forming the slurry. The remaining components of the gas may be any substances which are generally inert to the pigment. Air or one or more of its constituents is often the diluent. It is generally most advantageous to expose the pigment, on the average, to carbon dioxide gas in an amount equal to at least 0.1 percent of its own initial weight.

In another embodiment of this invention, it has been found that the viscosity of a siliceous pigment slurry may be maintained low by contacting a paste of siliceous pigment represented on an anhydrous basis by the formula $Z(SiO_2)_x$ with a gas having a carbon dioxide concentration in the range of 1 to 100 percent by weight before or during drying of the paste to the powder form prior to forming the slurry. Diluents in the gas may be any which are generally inert as is the case when the pigment is a flowable powder. Similarly, it is usually best to expose the pigment to at least about 0.1 percent of its own initial weight of carbon dioxide.

In order to compare the effectiveness of the treated pigment with that of the untreated pigment, it is often convenient to refer to the viscosity ratio. The viscosity ratio may be calculated from its defining equation:

$$v = \frac{\mu_{CO_2}}{\mu}$$

where $v$ = viscosity ratio
$\mu_{CO_2}$ = absolute viscosity of a slurry of carbon dioxide treated pigment
$\mu$ = absolute viscosity of a slurry of untreated pigment For both viscosity determinations, the pigment concentrations of the slurries are the same and the slurries are aged for a period of 24 hours at the time the viscosity is measured. The viscosity is determined at 25° C. with a Brookfield Viscometer using the proper size spindle at 20 revolutions per minute (r.p.m.). The particular pigment concentration chosen may be any convenient value such as 2 pounds of pigment per gallon of slurry. However, when the values of the viscosity ratios are different for different concentrations of pigment in the slurry, the pigment is characterized by the minimum value.

The time for which the pigment is exposed to a carbon dioxide containing gas will vary depending upon several factors. These include the concentration of carbon dioxide in the gas, the configuration of the contacting apparatus, the arrangement of the pigment within the contacting apparatus, the manner in which the gas is introduced to the pigment, and the temperature and pressure of the treatment. In any event, the treatment time utilized is such that the viscosity ratio of the pigment is less than one. As a general rule, the longer the treatment, the more beneficial the results. However, the rate of decrease in the viscosity ratio per unit of treatment time usually decreases with treatment time.

The absolute pressure of the gas during exposure of the pigment is usually about atmospheric pressure. Nevertheless, greater or lesser pressures may be used to advantage if desired.

The temperature of treatment is similarly susceptible to wide variation. While ambient temperatures falling in the range of −20 to 130° F. are generally used, lower temperatures such as −109° F., the sublimation point of carbon dioxide, or higher temperatures such as 400° F. may be used.

Any of the known manners of solid-gas contact may be applied to the present invention. However, those methods which encourage the mutual contacting of the two phases, such as agitating the pigment and/or gas, are preferred from a technological standpoint. Exemplary modes of effecting contact of the pigment and the carbon dioxide containing gas are sealing the pigment and the gas in a vessel, stirring the pigment and/or gas with a paddle, passing the gas through a tube containing the pigment, dropping the pigment through a tower containing the gas or introducing the gas throuh a distributor plate in the bottom of the vessel containing the pigment to form a fluidized bed of the pigment. In many of these processes, either the pigment or the gas or both the pigment and the gas may be introduced and/or removed from the system. Such transfers may be performed either continuously or intermittently. Thus, for example, pigment, as well as gas, may be continuously added to and removed from the fluidized bed in accordance with the known methods and apparatuses for removing solids to and from the fluidizing bed. Either countercurrent flow or parallel flow may be used when both the pigment or the gas are in movement relative to the apparatus which contains them.

Carbon dioxide treatment of the pigment may be accomplished while the free water content of the pigment is being reduced. Dryers of conventional design may be used for this purpose. Heat may be supplied to the dryer by transferring heat through a portion of the structural surface of the dryer or steam coils, electrical heating elements, or other sources of heat may be positioned within the dryer itself. Heated air or direct firing may be used if desired. The carbon dioxide containing gas is preferably circulated over the pigment. While the simultaneous carbon dioxide treatment and drying may be carried out either continuously or as a batch process, the former is preferred. A rotary dryer may be conveniently used for this purpose. Carbon dioxide containing gas may be passed either parallel or countercurrently to the travel of the pigment through the dryer. While the carbon dioxide treatment is usually performed on pigment powder having a free water content of from 0 to about 70 percent by weight, it is not necessary that the pigment be this dry when introduced to the dryer. Filter cake of siliceous pigment having a total water content of greater than about 70, often about 80 to about 85 percent by weight may be introduced to the dryer and dried in the presence of carbon dioxide containing gas. Usually such filter cake is dried until it has a free water content of about 1 to about 8 percent.

It is often convenient to expose the pigment to carbon dioxide containing gas by mixing one or more pieces of solid carbon dioxide with the pigment. The gas which evolves from the vaporizing solid carbon dioxide contacts the pigment as it passes through the interstices between the particles thereby effecting the desired treatment.

The treated pigment may be packaged and handled in the same manner as the untreated pigment. Thus, the treated pigment may be packaged in sacks, drums, boxes, hopper cars and tank cars and so shipped and stored. Untreated pigment or wholly or partially treated pigment may be treated by packaging it with carbon dioxide. In this embodiment, the pigment contacts the carbon dioxide during the handling period. The carbon dioxide may be introduced to the package either as a gas or as a solid. Very little modification of the heretofore used pigment production procedures would be required to achieve the advantages of this invention in this case.

The invention is applicable to treatment of mixed pigments containing at least one of the siliceous pigments described herein. It has been found that slurries of mixed pigments which pigments include a $Z(SiO_2)_x$ type pigment often increase in viscosity with aging even though the other pigments in the mixture normally provide relatively constant viscosities upon such aging. When dealing with slurries of these mixed pigments, there often appears to be an interaction of the $Z(SiO_2)_x$ pigment and the added pigment which affects the rate of viscosity increase and/or the ultimate maximum viscosity of the slurry upon aging. Thus, for example, slurries of mixed pigments sometimes exhibit high viscosities upon aging even though the concentration of $Z(SiO_2)_x$ pigment in the slurry is below that which would present little viscosity problem if the additional pigment were not present. Similarly, the additional pigment has its effect upon the minimum value of the total pigment concentration in the slurry which will cause unduly high viscosities upon aging. The effect of these additional pigments upon the viscosities of the slurries of mixed pigments is not readily predictable and must be determined empirically for each system.

The viscosities of slurries of these mixed pigments may be maintained at a low value by exposing the mixed pigments to carbon dioxide gas in similar fashion as when the pigment is only $Z(SiO_2)_x$ pigment. Alternatively, the carbon dioxide treated $Z(SiO_2)_x$ pigment may be mixed with other types of pigments prior to or during the formation of a slurry.

Examples of pigments which may be mixed with the $Z(SiO_2)_x$ pigment include, but are not limited to, $TiO_2$, clay, hydrated alumina, diatomaceous earth, $CaCO_3$, and mixtures of any of these.

Generally speaking, the variables which most directly affect the viscosity of an aged slurry of an untreated $Z(SiO_2)_x$ pigment, whether alone or mixed with other pigments are:

(1) the value of $x$;
(2) the identity of Z;
(3) the nature and concentration of impurities, if any;
(4) the concentration of the $Z(SiO_2)_x$ pigment in the total pigment;
(5) the nature of the other pigments present if any; and
(6) the concentration of the total pigment in the slurry.

The basic principles of the present invention have been incorporated by way of example in the following specific embodiments.

EXAMPLE I

The effect of exposing samples of a pigment having the following approximate composition:

$SiO_2$—79.1 percent
Ca expressed as CaO—6.0 percent
Free water—7.0 percent
Cl expressed as NaCl—1.1 percent
Al expressed as $Al_2O_3$—0.4 percent
Fe expressed as $Fe_2O_3$—0.1 percent
Bound water—6.3 percent
pH—10.0
Surface area—36 square meters per gram
Average ultimate particle size—0.1 micron to an atmosphere of carbon dioxide was investigated according to the following procedure. Individual samples were prepared by weighing 112.2 grams of pigment into an 185 millimeter crystallizing dish. Each sample was then placed into a vacuum desiccator which was evacuated by a water aspirator. Evacuation was continued until the rubber tubing between the aspirator and the dessicator collapsed. Essentially pure carbon dioxide gas was then fed into the dessicator. It required from 3 to 4 minutes for atmospheric pressure to be reached. Each sample was then exposed to the carbon dioxide for a period of time which varies from sample to sample. For the 1-hour exposure sample, the $CO_2$ flow was stopped after reaching atmospheric pressure. After the 1-hour period, it was found that a slight vacuum existed in the dessicator. A very small flow of $CO_2$ was maintained over each of the other samples during exposure. For the 60 and 30 minute exposures, timing was started after the desiccator reached atmospheric pressure with the $CO_2$. Timing for the other samples started with the admission of $CO_2$ into the desiccator. After exposure, the pigment of each sample was slurried in 387.8 milliliters of distilled water to yield slurries containing two pounds of pigment per gallon. Viscosity and pH measurements were made initially after 2 minutes of mixing and then subsequently after 24 hours and 7 days' aging with a 2 minutes stirring prior to each subsequent measurement. The results obtained are shown in Table 3.

TABLE 3

| | 2-pound per gallon slurries | | | | | |
|---|---|---|---|---|---|---|
| | Viscosity, centipoises at 20 r.p.m. | | | pH | | |
| Slurry aging period | 2 mins. | 24 hrs. | 7 days | 2 mins. | 24 hrs. | 7 days |
| Untreated pigment | 8 | 3,315 | 4,240 | 9.7 | 9.4 | 9.2 |
| Stored in $CO_2$: | | | | | | |
| 5 minutes | 120 | 620 | 1,496 | 8.4 | 8.6 | 8.8 |
| 10 minutes | 190 | 250 | 570 | 8.0 | 8.4 | 8.6 |
| 15 minutes | 234 | 190 | 350 | 7.9 | 8.3 | 8.5 |
| 30 minutes | 272 | 66 | 104 | 7.5 | 8.0 | 8.2 |
| 60 minutes | 296 | 46 | 46 | 7.4 | 7.8 | 8.1 |

EXAMPLE II

Two tubes, each 3 inches in diameter and 12 inches long, containing 150 grams of a pigment having the following approximate composition:

$SiO_2$—79.5 percent
Ca expressed as CaO—4.7 percent
Free water—7.8 percent
Cl expressed as NaCl—1.5 percent
Al expressed as $Al_2O_3$—0.6 percent
Fe expressed as $Fe_2O_3$—0.1 percent Bound water—5.8 percent
pH—9.8
Surface area—47 square meters per gram
Average ultimate particle size—0.1 micron were connected in series. During a period of one hour, 2.6 liters of a gas comprising 40 per cent $CO_2$ and 60 per cent air by volume were introduced into the bottom tube. After an additional 1½ hour aging period, two 2-pound per gallon slurries were prepared using the pigment from each tube respectively. The total carbon dioxide treatment was 0.6 percent by weight based on the pigment content of both tubes, or 1.2 percent by weight based on the content of only the bottom tube, which appears from the data to have absorbed most or all of the $CO_2$ introduced. The slurries were aged varying amounts, and the viscosity measured. The results are reported in Table 4.

TABLE 4

| | 2-pound per gallon slurries | | | | | |
|---|---|---|---|---|---|---|
| | Viscosity, centipoises at 20 r.p.m. | | | pH | | |
| Aging period | Untreated pigment | Bottom tube | Top tube | Untreated pigment | Bottom tube | Top tube |
| 0 | 20 | 80 | 20 | 9.67 | 8.32 | 9.58 |
| 1 hour | 30 | 240 | 40 | 9.40 | 8.19 | 9.35 |
| 24 hours | 4,700 | 500 | 4,500 | 9.15 | 8.30 | 9.09 |
| 4 days | 6,100 | 860 | 6,300 | 9.1 | 8.40 | 9.00 |

EXAMPLE III

Pigment having the following approximate composition:

$SiO_2$—78.7 percent
Ca expressed as CaO—5.9 percent
Free water—6.1 percent
Cl expressed as NaCl—1.6 percent
Al expressed as $Al_2O_3$—0.6 percent
Fe expressed as $Fe_2O_3$—0.1 percent
Bound water—7.0 percent
pH—10.0
Surface area—44 square meters per gram
Average ultimate particle size—0.1 micron was divided into two 111.2 gram portions. Solid carbon dioxide in the amount of 0.44 gram was placed in the bottom of an 800 milliliter beaker. This was covered with one portion of the pigment. Consequently, the weight of carbon dioxide was 0.4 percent of the weight of the pigment. The other portion of pigment was placed in another 800 milliliter beaker as a control. These samples were allowed to stand for about 20 hours before adding water (sufficient to give a total of 389 milliliters) to prepare 2-pound per gallon slurries, portions of which were transferred to 600 milliliter beakers for viscosity and pH measurements which were made initially after 2 minutes of mixing and then subsequently after 1 hour, 2 hours, 1 day, 2 days and 5 days aging of each slurry with a two minute stirring prior to each subsequent measurement. The results are presented in Table 5.

TABLE 5

| | 2-pound per gallon slurries | | | |
|---|---|---|---|---|
| | Viscosity, centipoises at 20 r.p.m. | | pH | |
| Slurry aging period | Untreated pigment (control) | Pigment treated with 0.4% $CO_2$ (as solid) | Untreated pigment (control) | Pigment treated with 0.4% $CO_2$ (as solid) |
| 2 minutes | 14 | 810 | 9.4 | 7.7 |
| 1 hour | 250 | 644 | 9.3 | 7.8 |
| 2 hours | 784 | 650 | 9.2 | 7.8 |
| 1 day | 6,120 | 954 | 9.0 | 8.0 |
| 2 days | 7,150 | 1,212 | 9.0 | 8.0 |
| 5 days | 8,610 | 1,350 | 9.0 | 8.2 |

EXAMPLE IV

A washed filter cake of siliceous pigment of the type represented by Table I but having a free water content of about 83 percent is introduced into the upper end of a gently sloped cylindrical dryer containing tubes heated with 140 p.s.i.g. saturated steam. Air containing about 30 percent carbon dioxide by volume is introduced into the dryer at the lower end and passed countercurrently to the general direction of pigment flow. The temperature of the gaseous effluent leaving the dryer is about 250° F. Pigment discharging from the lower end has a free moisture content of about 6 percent and has a viscosity ratio less than one.

While the invention has been described with reference to certain illustrative embodiments, it is not intended that it be limited thereby except insofar as appears in the accompanying claims.

I claim:

1. A method of adjusting the viscosity imparting properties of a siliceous pigment comprising contacting a flowable pigment powder having a free water content in the range of 0 to about 70 percent by weight and represented on an anhydrous basis by the formula $Z(SiO_2)_x$ wherein Z nominally represents one or more oxides of one or more multivalent metals and wherein $x$ is in the range of 3.3 to about 100 with a gas having a carbon dioxide concentration in the range of 1 to 100 percent by weight to impart to said pigment a viscosity ratio which is less than one.

2. The method of claim 1 wherein said pigment is exposed, on the average, to carbon dioxide gas in an amount equal to at least 0.1 percent of its own initial weight.

3. The method of claim 1 wherein the absolute pressure of the gas is about atmospheric pressure.

4. The method of claim 1 wherein the carbon dioxide gas is introduced to the pigment as a gas.

5. The method of claim 1 wherein the carbon dioxide gas is introduced to the pigment as a solid.

6. The method of claim 1 wherein the pigment is agitated in the presence of the gas.

7. The method of claim 1 wherein the pigment is associated with other pigments during contact with said gas.

8. The method of claim 1 wherein Z represents principally the oxide of an alkaline earth metal.

9. The method of claim 8 wherein Z represents principally calcium oxide.

10. The method of claim 1 wherein the water content of the pigment is reduced while the pigment is being contacted with said gas.

11. A flowable siliceous pigment powder having a free water content in the range of 0 to about 70 percent by weight and represented on an anhydrous basis by the formula $Z(SiO_2)_x$ wherein Z nominally represents one or more oxides of one or more multivalent metals and wherein $x$ is in the range of 3.3 to about 100, which has been contacted with carbon dioxide according to the method of claim 1.

12. The flowable siliceous pigment powder of claim 11 having an average ultimate particle size less than 1.0 micron.

13. The flowable siliceous pigment powder of claim 12 having an average ultimate particle size of from about 0.0005 to about 0.5 micron.

14. The flowable siliceous pigment powder of claim 11 wherein Z represents principally the oxide of an alkaline earth metal.

15. The flowable siliceous pigment powder of claim 13 wherein Z represents principally calcium oxide.

16. The flowable siliceous pigment powder of claim 15 wherein $x$ is in the range of from about 5 to about 30.

17. A method of adjusting the viscosity imparting properties of a siliceous pigment comprising contacting a paste of undried siliceous pigment, said paste having a free water content in the range of greater than about 70 to about 85 percent by weight and represented on an anhydrous basis by the formula $Z(SiO_2)_x$ wherein Z nominally represents one or more oxides of one or more multivalent metals and wherein $x$ is in the range of 3.3 to about 100, while drying said pigment to the powder form, with a gas having a carbon dioxide concentration in the range of 1 to 100 percent by weight to impart to said pigment a viscosity ratio which is less than one.

18. A method of adjusting the viscosity imparting properties of a siliceous pigment comprising:
(a) contacting a paste of undried siliceous pigment, said paste having a free water content in the range of greater than about 70 to about 85 percent by weight and represented on an anhydrous basis by the formula $Z(SiO_2)_x$ wherein Z nominally represents one or more oxides of one or more multivalent metals and wherein $x$ is in the range of 3.3 to about 100, with a gas having a carbon dioxide concentration in the range of 1 to 100 percent by weight to impart to said pigment a viscosity ratio which is less than one; and
(b) drying said contacted pigment to the powder form.

19. A method of adjusting the viscosity imparting properties of a siliceous pigment comprising heating a previously undried siliceous pigment represented on an anhydrous basis by the formula $Z(SiO_2)_x$ wherein Z nominally represents one or more oxides of one or more multivalent metals and wherein $x$ is in the range of 3.3 to about 100, to reduce the free water content thereof from the range of greater than about 70 to about 85 percent by weight to the range of about 1 to about 8 percent by weight while contacting said pigment with a gas having a carbon dioxide concentration in the range of 1 to 100 percent by weight to impart to said pigment a viscosity ratio which is less than one.

20. The method of claim 19 wherein the free water content of said previously undried siliceous pigment is reduced from the range of about 80 to about 85 percent by weight to the range of about 1 to about 8 percent by weight.

References Cited

UNITED STATES PATENTS

| 3,034,914 | 5/1962 | Lagerstrom. | |
| 3,400,002 | 9/1968 | Bauer | 106—309 |

TOBIAS E. LEVOW, Primary Examiner

H. M. S. SNEED, Assistant Examiner

U.S. Cl. X.R.

106—288B, 306